United States Patent
Park et al.

(10) Patent No.: US 10,658,649 B2
(45) Date of Patent: May 19, 2020

(54) BATTERY PACK ELECTRONIC EQUIPMENT CHAMBER AND BATTERY PACKAGE COMPRISING SAME

(71) Applicant: Tyco Electronics AMP Korea Co., Ltd, Gyungsangbuk-do (KR)

(72) Inventors: Young Geun Park, Gyungsangbuk-Do (KR); Dong Ha Park, Gyunsangbuk-Do (KR)

(73) Assignee: Tyco Electronics AMP Korea Co., Ltd., Gyungsangbuk-do (KR)

( * ) Notice: Subject to any disclaimer, the term of this patent is extended or adjusted under 35 U.S.C. 154(b) by 912 days.

(21) Appl. No.: 14/942,495

(22) Filed: Nov. 16, 2015

(65) Prior Publication Data

US 2016/0072118 A1  Mar. 10, 2016

Related U.S. Application Data

(63) Continuation of application No. PCT/KR2014/004384, filed on May 16, 2014.

(30) Foreign Application Priority Data

May 16, 2013 (KR) .................. 10-2013-0055654
Sep. 24, 2013 (KR) .................. 10-2013-0113056

(51) Int. Cl.
  *H01M 2/20* (2006.01)
  *H01M 10/6563* (2014.01)
  (Continued)

(52) U.S. Cl.
  CPC ............ *H01M 2/34* (2013.01); *H01H 85/055* (2013.01); *H01H 85/165* (2013.01);
  (Continued)

(58) Field of Classification Search
  CPC ...... H01M 2/34; H01M 2/1072; H01M 2/206; H01M 10/425; H01M 10/6563;
  (Continued)

(56) References Cited

U.S. PATENT DOCUMENTS 6,344,728 B1 * 2/2002 Kouzu .................. B60L 3/0046
                                                     320/116
8,125,192 B2 * 2/2012 Yoon ........................ B60K 6/28
                                                     320/134
(Continued)

FOREIGN PATENT DOCUMENTS

| JP | 2009289428 A | 12/2009 |
| JP | 2012059663 A | 3/2012 |
| KR | 20130014164 A | 2/2013 |
| KR | 1020130021801 A | 3/2013 |
| KR | 1020070100555 | 5/2013 |
| WO | 2008048751 A2 | 4/2008 |

OTHER PUBLICATIONS

International Search Report, International Application No. PCT/KR2014/004384, dated Aug. 27, 2014, 2 pages.
(Continued)

*Primary Examiner* — Amy Cohen Johnson
*Assistant Examiner* — Paul D Baillargeon
(74) *Attorney, Agent, or Firm* — Barley Snyder

(57) ABSTRACT

An electronic equipment chamber is disclosed. The electronic equipment chamber has an electronic equipment chamber board on which at least one electronic component among a current sensor, a relay, and a fuse is disposed, a controller located in a center of the electronic equipment chamber board, the controller electrically connected to the electronic component and configured to control the electronic component, and a plurality of busbars electrically connected to the electronic component and disposed along an outer edge of the electronic equipment chamber board, the plurality of busbars spaced apart from the controller.

19 Claims, 8 Drawing Sheets

(51) Int. Cl.
  *H01M 2/34* (2006.01)
  *H01M 10/42* (2006.01)
  *H01M 2/10* (2006.01)
  *H01H 85/055* (2006.01)
  *H01H 85/165* (2006.01)
  *H01H 89/00* (2006.01)
  *H01H 85/20* (2006.01)
  *H01H 85/02* (2006.01)

(52) U.S. Cl.
  CPC .......... *H01H 89/00* (2013.01); *H01M 2/1072* (2013.01); *H01M 2/206* (2013.01); *H01M 10/425* (2013.01); *H01H 85/203* (2013.01); *H01H 2085/025* (2013.01); *H01M 10/6563* (2015.04); *H01M 2200/103* (2013.01); *H01M 2220/20* (2013.01)

(58) Field of Classification Search
  CPC ....... H01M 2200/103; H01M 2220/20; H01M 2/22; H01M 2/24; H01H 85/055; H01H 85/165; H01H 89/00; H01H 85/203
  USPC ....................................................... 439/76.1
  See application file for complete search history.

(56) References Cited

U.S. PATENT DOCUMENTS

| | | | |
|---|---|---|---|
| 2008/0090137 A1* | 4/2008 | Buck | H01M 2/1077 429/120 |
| 2008/0118819 A1* | 5/2008 | Gamboa | H01M 2/0245 429/61 |
| 2010/0124693 A1 | 5/2010 | Kosugi et al. | |
| 2014/0141306 A1* | 5/2014 | Kusunoki | H01M 2/1016 429/98 |
| 2014/0154531 A1* | 6/2014 | Furuya | H01M 2/20 429/7 |

OTHER PUBLICATIONS

Abstract of KR20130014164(A), dated Feb. 7, 2013, 1 page.
Abstract of JP2009289428(A), dated Dec. 10, 2009, 1 page.
Abstract of KR20130021801(A), dated Mar. 6, 2013, 1 page.
Abstract of JP2012059663(A), dated Mar. 22, 2012, 1 page.
Chinese First Office Action and English translation of Office Action, dated Mar. 2, 2017, 10 pages.
Abstract of KR 1020070100555, dated May 6, 2013, 2 pages.

* cited by examiner

BATTERY PACK ELECTRONIC EQUIPMENT CHAMBER AND BATTERY PACKAGE COMPRISING SAME

CROSS-REFERENCE TO RELATED APPLICATIONS

This application is a continuation of PCT International Application No. PCT/KR2014/004384 filed May 16, 2014, which claims priority under 35 U.S.C. § 119 to Korean Patent No. 10-2013-0055654 filed May 16, 2013 and Korean Patent No. 10-2013-0113056 filed Sep. 24, 2013.

FIELD OF THE INVENTION

The present invention relates to an electronic equipment chamber, and more particularly, to a battery package including the electronic equipment chamber.

BACKGROUND

A battery package in a battery cell module is commonly electrically connected to an electronic control unit (ECU) of a vehicle. As disclosed in Korean Patent Publication No. 10-2007-0100555, it is known for the battery cell module to include a plurality of battery cells inserted into a plurality of cell covers so that connection plates formed in both ends are connected in series, a main frame into which the cell cover is inserted along a guide groove, and a top cover to fix a cell cover into which the battery cell is inserted to the main frame.

To control charging and discharging of each battery cell included in the known battery package, an electronic equipment chamber including electronic components is required. The known electronic equipment chamber has high current flows in busbars, which may cause an electromagnetic field error to other electronic components installed in the electronic equipment chamber. Electronic components including, for example, a relay or an inverter, are manufactured and installed as separate components; a product including these electronic components may require a space for installing each of the electronic components.

Furthermore, a separate space for installing each of the battery package and the electronic equipment chamber is required, which may lead to a further increase in volume. Accordingly, there is a desire for a structure to save space by efficiently arranging electronic components.

SUMMARY

An object of the invention is to provide an electronic equipment chamber that is small in volume and that enables electronic components to stably operate, based on an efficient arrangement of busbars, and the like, and a battery package including the electronic equipment chamber. The disclosed electronic equipment chamber has an electronic equipment chamber board on which at least one electronic component among a current sensor, a relay, and a fuse is disposed, a controller located in a center of the electronic equipment chamber board, the controller electrically connected to the electronic component and configured to control the electronic component, and a plurality of busbars electrically connected to the electronic component and disposed along an outer edge of the electronic equipment chamber board, the plurality of busbars spaced apart from the controller.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of an electronic equipment chamber and a battery package including the electronic equipment chamber. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
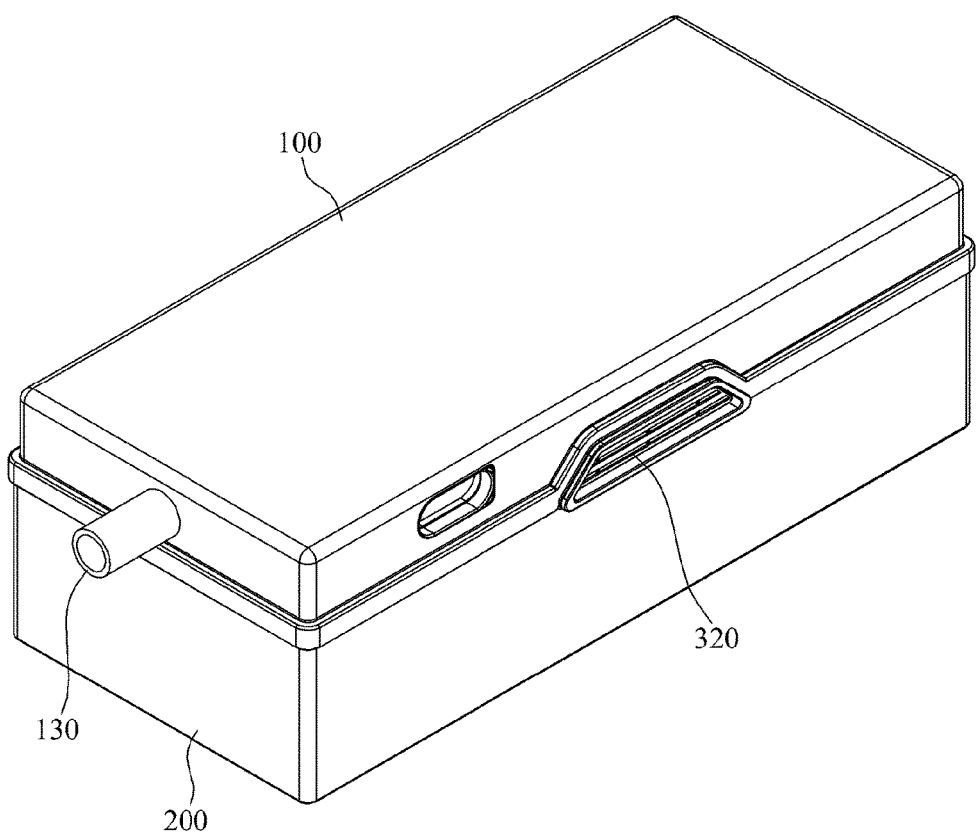
FIG. 1 is a perspective view of a battery package according to the invention.
Figure 2:
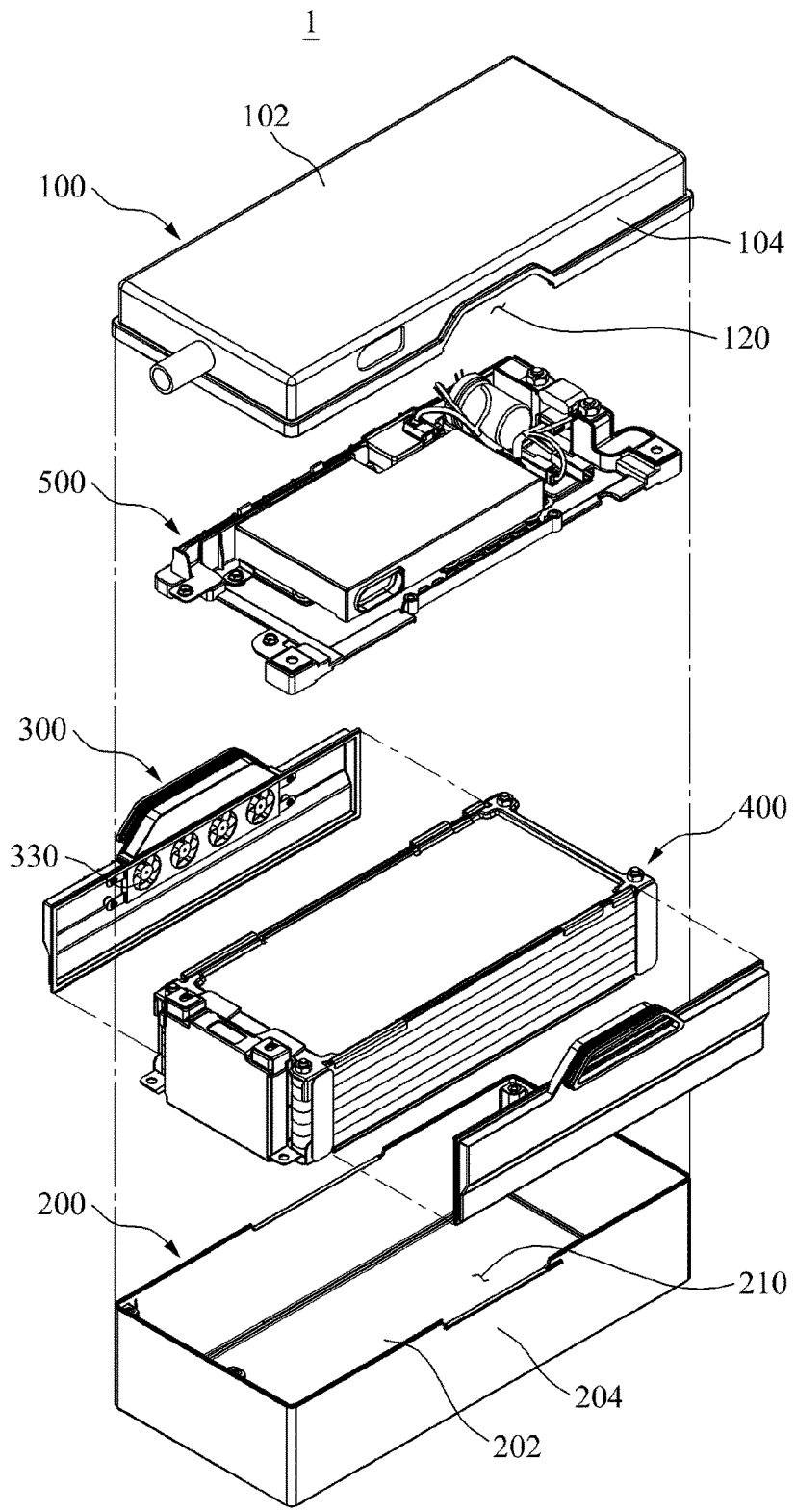
FIG. 2 is an exploded perspective view of the battery package of FIG. 1.

FIGS. 1 and 2 show a battery package 1 according to the present invention. The battery package 1 includes an upper cover 100, a lower cover 200, a side cover 300, a battery module 400, and an electronic equipment chamber 500. The major components of the invention will now be described in greater detail.

The upper cover 100, as shown in FIGS. 1 and 2, includes a top surface 102, a first extending portion 104, an air communication channel receiving portion 120, and an exhaust channel 130.

The first extended portion 104 extends from the top surface 102 around the circumference of the top surface 102. The air communication channel receiving portion 120 may be recessed upwardly from a lower portion of the first extended portion 104. An exhaust channel 130 may be located in, for example, one side of the first extended portion 104. In the embodiment, the exhaust channel 130 is a cylindrical member, but one skilled in the art would appreciate that the exhaust channel 130 could be a variety of shapes.

The lower cover 200, as shown in FIG. 2, includes a bottom surface 202, a second extended portion 204, and an air communication channel seating portion 210.

The second extended portion 204 extends from the bottom surface 202 around the circumference of the bottom surface 202. The air communication channel seating portion 210 may be recessed downwardly from the upper end of the second extended portion 204; the second extended portion 204 defines the air communication channel seating portion 210. The second extended portion 204 may have a shape of a box with an open upper side.

Figure 5:
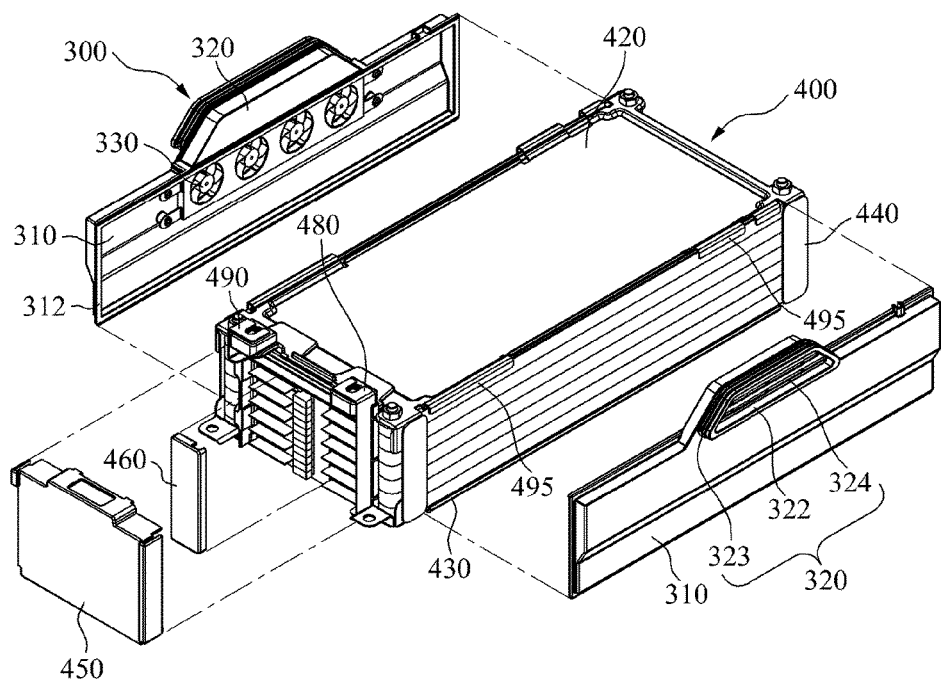
FIG. 5 is an exploded perspective view of a battery module and a side cover according to the battery package of FIG. 1.
Figure 7:
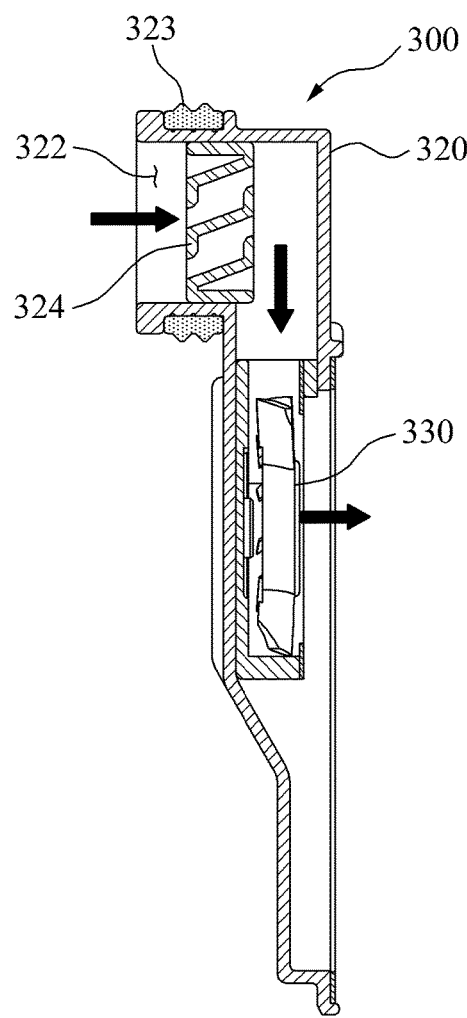
FIG. 7 is a sectional view of a side cover according to the battery package of FIG. 1.
Figure 8:
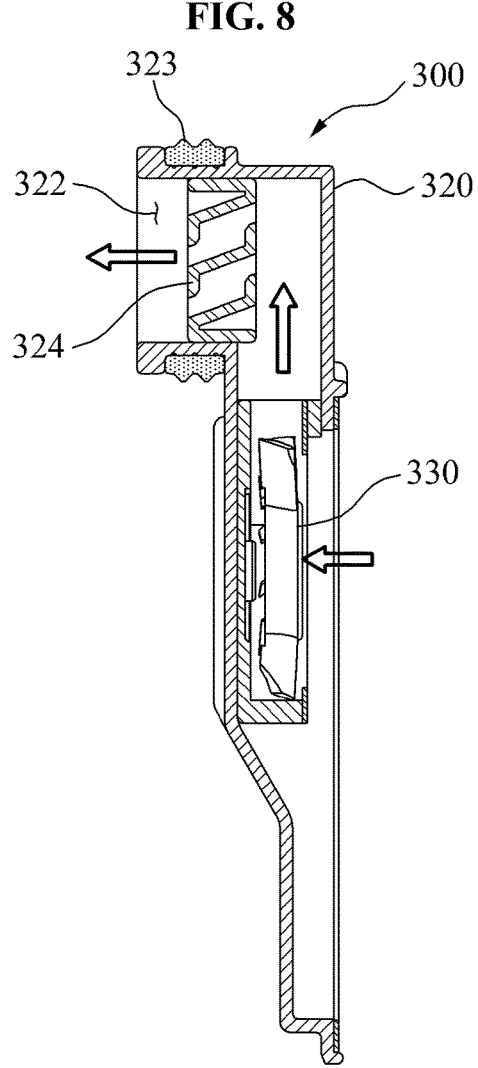
FIG. 8 is a sectional view of a side cover according to the battery package of FIG. 1.

The side cover 300, as shown in FIGS. 5, 7, and 8, includes plate 310, sealing member 312, air communication channel 320, and blower 330.

The plate 310 may correspond to a main body of the side cover 300. A sealing member 312 may be located at an edge portion of the plate 310.

The air communication channel 320 is disposed in one side of the plate 310, and may be formed integrally with one side of the plate 310. For example, the air communication channel 320 may be formed in an upper side of the plate 310. The air communication channel 320 may gradually decrease in width from the plate 310 to an upper side. The air communication channel 320 may be bent; the air communication channel 320 may have, for example, an "L" shape.

The air communication channel 320, as shown in FIGS. 7 and 8, may include an air communication opening 322, an airtight member 323 and an air communication grill 324.

The air communication opening 322 may fluidly communicate with the outside and may increase in width from one side to the other side. The air communication opening 322 may have, for example, a trapezoidal shape. The outer circumference of the air communication opening 322 may be referred to as an "extension channel." The extension channel may extend in a direction perpendicular to the plate 310. The extension channel may be located in an upper side of the cover. In other words, a part of the air communication channel 320 may be understood to be located in the upper side of the cover.

The airtight member 323 may be located on an outer circumference of the air communication opening 322 and may cover the outer circumference of the air communication opening 322. The airtight member 323 may include a plurality of projections.

The air communication grill 324 may be located in one side of the air communication opening 323. The air communication grill 324 may function to filter out foreign materials included in air flowing in through air communication opening 323. The air communication grill 324 may be inclined downwardly. An outer end of the air communication grill 324 may be downwardly bent, and an inner end of the air communication grill 324 may be upwardly bent.

The blower 330 is disposed on one side of the air communication channel 320, in a rear side of the plate 310. The blower 330 may be connected to a lower side of the air communication channel 320. The blower 330 may be included in one of the pair of side covers 300 or both the side covers 300.

Figure 6:
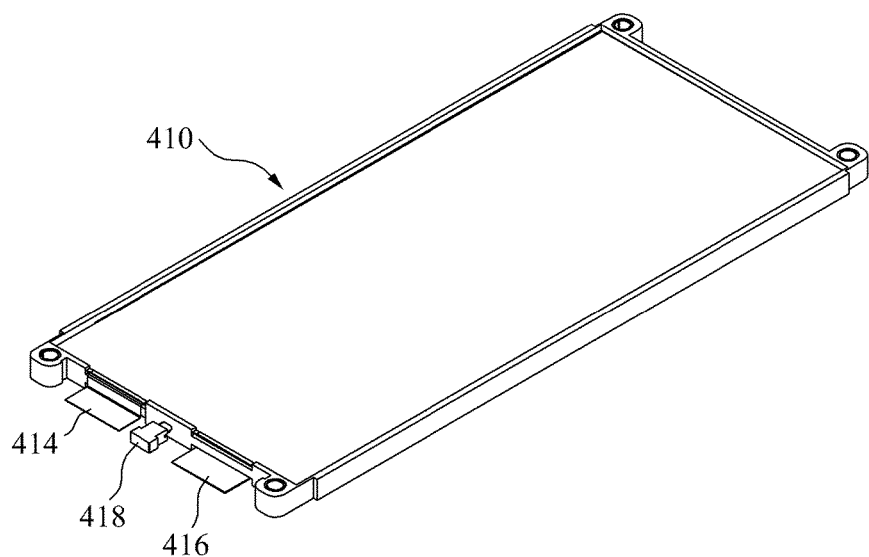
FIG. 6 is a perspective view of a battery cell according to the battery package of FIG. 1.

The battery module 400, as shown in FIGS. 5 and 6, may include at least one battery cell 410, an upper module cover 420, a lower module cover 430, a support 440, an front module cover 450, a discharge guide 460, the first internal battery terminal 480, the second internal battery terminal 490, and a guide portion 495. The battery module 400 may have a parallelepipedal shape.

The battery module 400 may be formed by stacking a plurality of battery cells 410. Hereinafter, a single battery cell 410 will be described with reference to FIG. 6. The battery cell 410 may include an anode portion 414, a cathode portion 416, a connecting portion 418 and an exhaust portion (not shown). Also, an air flow passage may be formed by stacking at least one part of the plurality of battery cells 410 at intervals. Through the air flow passage, heat generated in the battery cells 410 may be radiated.

The anode portion 414 and the cathode portion 416 may be connected to the first internal battery terminal 480 and the second internal battery terminal 490. Both the electrodes, anode portion 414 and cathode portion 416, may be located on a front side of the battery module, as shown in FIG. 6. The connecting portion 418 may be connected to a lead of the battery cell 410, to sense a flowing current from the battery cell 410.

The exhaust portion may be open and may allow materials included in the battery cell 410 to be discharged in an abnormal situation, for example, a malfunction of the battery cell 410 or an external shock applied to the battery cell 410. In an example, the battery cell 410 may be a pouch-type battery. In this example, the exhaust portion may be attached with a lower adhesive strength than those of the other portions. The exhaust portion may be located in, for example, one side of the battery cell 410. In FIG. 5, the exhaust portion may be located on a front side. The exhaust portion may be located between the anode portion 414 and the cathode portion 416.

The upper module cover 420, the lower module cover 430 and the front module cover 450 may be, for example, the upper module cover 420 covering an upper side of the battery cell 410, the lower module cover 430 covering a lower side of the battery module 400, and the front module cover 450 covering a front side of the battery module 400. Also, a rear side module cover covering a rear side of the battery module 400 may be further provided, although not shown in the drawings.

The support 440 is positioned on one side of the battery cell 410. The support 440, together with the upper module cover 420, the lower module cover 430 and the front module cover 450, may function to maintain a shape of the stacked battery cells 410.

The discharge guide 460 may be located between the front module cover 450 and the battery cells 410, and may cover the exhaust portion. The discharge guide 460 may have a U-shaped cross section based on the exhaust portion.

The guide portion 495 may have, for example, a shape of a rake, and is positioned on an edge of the upper module cover 420.

Figure 3:
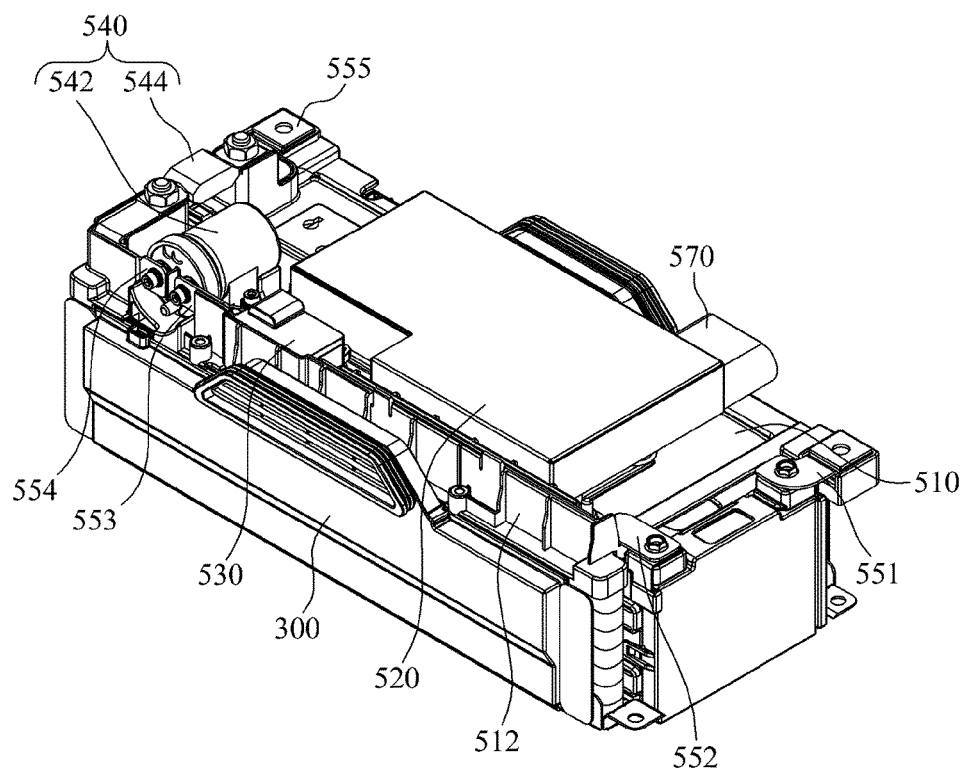
FIG. 3 is a perspective view of an electronic equipment chamber according to the battery package of FIG. 1.
Figure 4:
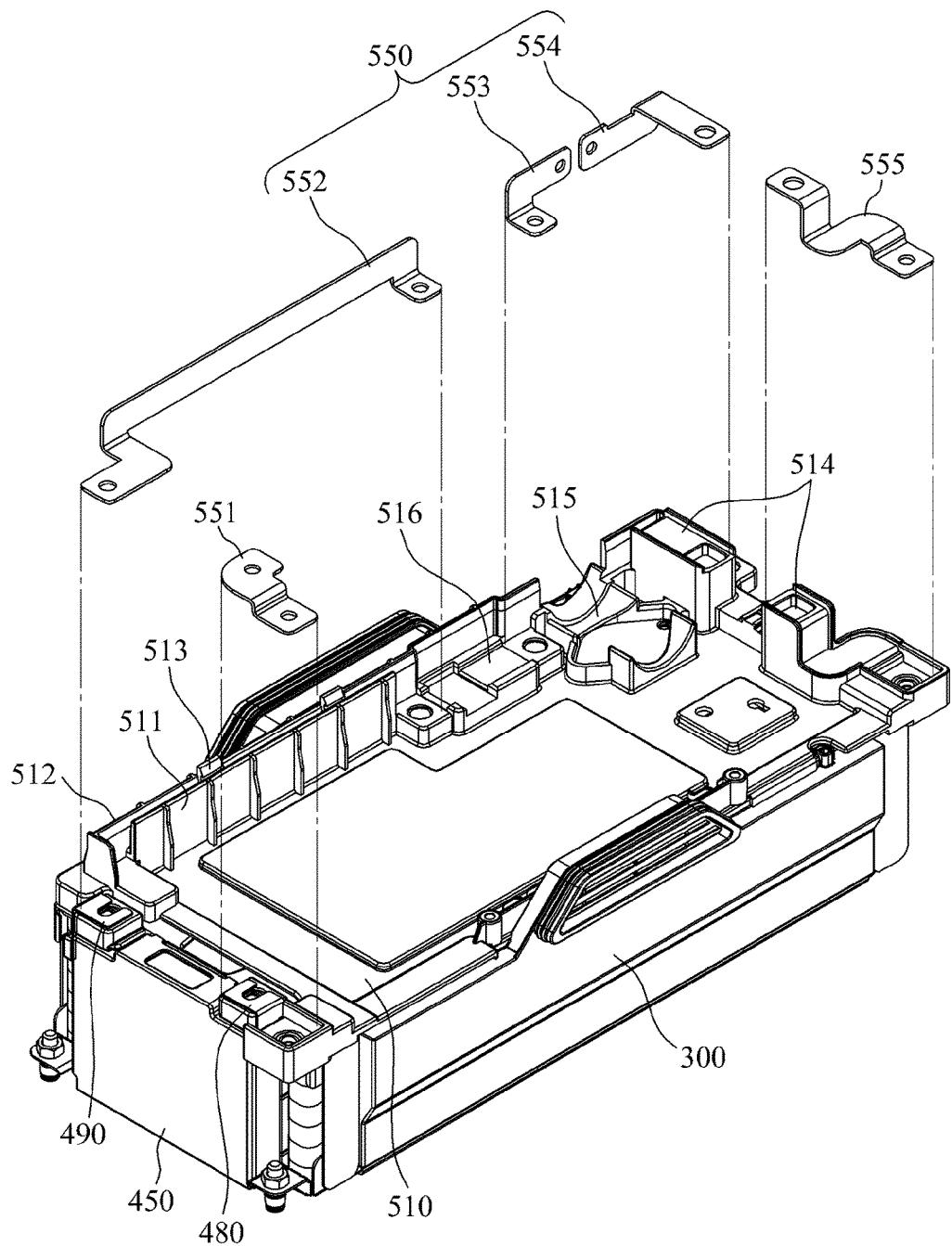
FIG. 4 is an exploded perspective view of the electronic equipment chamber of FIG. 3.

Referring to FIGS. 3 and 4, the electronic equipment chamber 500 may include an electronic equipment chamber board 510, a controller 520, a current sensor 530, a current breaker 540, a plurality of busbars 550, a connector 570, and an external battery terminal (not shown).

The electronic equipment chamber board 510 may include an internal partition wall 511, an external partition wall 512, a fuse seating portion 514, a relay seating portion 515 and a current sensor seating portion 516. The internal partition wall 511 and the external partition wall 512 may support the busbars 550, and the fuse seating portion 514, the relay seating portion 515 and the current sensor seating portion 516 may stably seat a plurality of electronic components. The internal partition wall 511 and external partition wall 512, the fuse seating portion 514, the relay seating portion 515 and the current sensor seating portion 516 will be further described below.

The electronic equipment chamber board 510 may form a space to support electronic components mounted in the electronic equipment chamber 500. Also, the electronic equipment chamber board 510 may be located above the battery module and may function to seal at least a part of the upper side of the battery module.

The controller 520, the current sensor 530 and the current breaker 540 may be disposed on the electronic equipment chamber board 510. The busbars 550 may connect the controller 520, the current sensor 530 and the current breaker 540.

The controller 520 may collect information from the current sensor 530, the current breaker 540 and the like. To reduce a length of a wire connecting the controller 520 and another electronic component, the controller 520 may be located in a center of the electronic equipment chamber board 510.

The controller 520 may have, for example, a rectangular shape, and a corner portion of the controller 520 may be recessed inwardly. A connector 570 may be seated in the recessed portion. Another corner portion of the controller 520 may be recessed inwardly. The current sensor 530 may be installed in the another recessed portion. A circuit substrate included in the controller 520 may have a shape corresponding to a shape of the controller 520.

The current sensor 530 may sense a magnitude of current flowing in the busbars 550. Information of current sensed by the current sensor 530 may be transferred to the controller 520 and/or a relay 542. The current sensor 530 may be seated in the current sensor seating portion 516 formed in the electronic equipment chamber board 510. The current sensor seating portion 516 may be formed in one side of a corner portion of the electronic equipment chamber board 510.

The current breaker 540 may function to block the current flowing in the busbars 550 when the magnitude of the current is excessively high. The current breaker 540 may include the relay 542 and a fuse 544.

The relay 542 may electrically connect or disconnect busbars 553 and 554 respectively connected to both terminals of the relay 542. The relay 542 may include a switch that is selectively connected to the terminals of the relay 542, and may operate based on a control command of the controller 520.

The relay 542 may be seated in the relay seating portion 515 formed in the electronic equipment chamber board 510. The relay seating portion 515 may be formed in one side of a corner portion of the electronic equipment chamber board 510. The relay seating portion 515 may be formed in one side of the current sensor seating portion 516. For example, the relay seating portion 515 and the current sensor seating portion 516 may be aligned in the same corner portion. The relay seating portion 515 may be disposed in a position corresponding to a side of the relay 542 so that the terminals of the relay 542 may face the outside of the electronic equipment chamber 500. For example, when the relay 541 has a cylindrical shape and both terminals on a top surface, the relay seating portion 515 may have a recessed shape corresponding to the cylindrical shape. In this example, by laying the relay 542, it is possible to prevent an increase in a height of the electronic equipment chamber 500.

The fuse 544 may function to interrupt an electrical connection between busbars 554 and 555 by physically separating the busbar 554 and 555, when an excessively large amount of current flows to the busbar 554 and 555. The busbars 554 and 555 may be connected to both terminals of the fuse 544, respectively. The fuse 544 may be detachably provided, and may be replaced when an error occurs in the fuse 544 or when the fuse 544 blows.

The fuse 544 may be seated in the fuse seating portion 514 formed in the electronic equipment chamber board 510. The fuse seating portion 514 may be formed in one side of a corner portion of the electronic equipment chamber board 510. For example, the fuse seating portion 514 may be formed in a corner portion neighboring the corner portion in which the relay seating portion 515 is located. The fuse seating portion 514 may protrude upwardly from the electronic equipment chamber board 510. The fuse seating portion 514 may have a height higher than those of the relay seating portion 515 and the current sensor seating portion 516. Based on the above shape of the fuse seating portion 514, it is possible to facilitate replacement of the fuse 544.

The busbars 550 may include, for example, a plurality of busbars to electrically connect battery cells and electronic components of the electronic equipment chamber 500. For example, the busbars 550 may include a first busbar 551, a second busbar 552, a third busbar 553 to connect the current sensor 530 and the relay 542, a fourth busbar 554 to connect the relay 542 and the fuse 544, and a fifth busbar 555 to connect the fuse 544 and the second external battery terminal (not shown). In the present invention, a number of busbars may not be limited. For example, a single busbar may include a plurality of busbars depending on circumstances.

The one end of the first busbar 551 may be disposed in a lower position than the other end, and a bending portion may be formed between both the ends. A receiving portion to receive the one end of the first busbar 551 may be formed in a corner of one side of the electronic equipment chamber board 510. The receiving portion may include a wall upwardly extending to prevent the first busbar 551 from being separated.

Both the ends of the second busbar 552 may be formed in parallel to the electronic equipment chamber board 510, and may be connected by a vertical portion orthogonal to the electronic equipment chamber board 510. The vertical portion may be located outside the electronic equipment chamber board 510. By a shape of the vertical portion, an internal installation space of the electronic equipment chamber board 510 may become wider.

The internal partition wall 511 and external partition wall 512 may each have a height higher than a height of the vertical portion. The internal partition wall 511 and external partition wall 512 may support one side of the vertical portion. The internal partition wall 511 may be located between the vertical portion and the controller 520, and the external partition wall 512 may support another, opposite side of the vertical portion. The electronic equipment chamber board 510 may further include a separation preventing portion 513 that is located above the internal partition wall 511 and external partition wall 512. The separation preventing portion 513 forms an abutment between the walls 511, 512 that is configured to prevent the vertical portion from being upwardly separated from the electronic equipment chamber board 510.

The internal partition wall 511 may prevent the controller 520 from being affected by an electromagnetic wave generated by a current flowing in the vertical portion. The separation preventing portion 513 may have a hook shape.

One end of the third busbar 553 may be connected to the other terminal of the current sensor 530 and the other end may be connected to one of the terminals of the relay 542. Both the ends of the third busbar 553 may not be disposed parallel to each other. For example, the one end of the third busbar 553 may be formed in parallel to the electronic equipment chamber board 510, and the other end may be formed in perpendicular to the electronic equipment chamber board 510. The other end of the third busbar 553 may be perpendicular to the electronic equipment chamber board 510 so as to correspond to an arrangement of the terminals of the relay 542.

One end of the fourth busbar 554 may be connected to the other terminal of the relay 542 and the other end may be connected to one side of the fuse 544. The one end of the fourth busbar 554 may be perpendicular to the electronic equipment chamber board 510 so as to correspond to the arrangement of the terminals of the relay 542. The other end of the fourth busbar 554 may be bent from the one end and may be parallel to the electronic equipment chamber board 510.

Based on a shape of each of the other end of the third busbar 553 and the one end of the fourth busbar 554, the relay 542 lying on the electronic equipment chamber 500 may be pushed toward the outside, and accordingly the relay 542 may be easily connected to the third busbar 553 and the fourth busbar 554.

One end of the fifth busbar 555 may be connected to the other side of the fuse 544 and the other end of the fifth busbar 555 may be connected to the second external battery terminal (not shown). The one end of the fifth busbar 555 may be disposed in parallel to the electronic equipment chamber board 510.

Based on a shape of each of the other end of the fourth busbar 554 and the one end of the fifth busbar 555, the fuse 544 may be easily located in the electronic equipment chamber 500 by downwardly seating the fuse 544. Similarly, the fuse 544 may be easily separated from the electronic equipment chamber 500.

The assembly of the battery package 1 will now be described primarily with reference to FIGS. 1 and 2. The battery package 1 may be configured by sequentially stacking the lower cover 200, the battery module 400, the electronic equipment chamber 500 and the upper cover 100.

The upper cover 100 may be disposed in an upper side of the battery module 400. The top surface 102 is configured to cover a top of the battery module 400. The air communication channel receiving portion 120 may receive the air communication channel 320 of the side cover 300 at the air communication opening 322; such that part of the airtight member 323 may be in close contact with the air communication channel receiving portion 120, preventing air from flowing between the air communication channel 320 and the upper cover 100. The air communication channel receiving portion 120 may be understood to support an upper side of the air communication channel 320.

The lower cover 200 may be located below the battery module 400. The lower cover 200 may include a space to house the battery module 400. An upper end of the second extended portion 204 may be in close contact with a lower end of the upper cover 100, for example, a lower end of the first extended portion 104, as shown in FIG. 1. The upper end of the first extended portion 204 and the lower end of the upper cover 100 may include a sealing member, for example, rubber, to prevent air from flowing between the upper cover 100 and the lower cover 200.

The air communication channel 320 or a part of the air communication channel 320 of the side cover 300 is seated in the air communication channel seating portion 210. The air communication channel seating portion 210 may be in close contact with the air communication channel 320 at airtight member 323, which may prevent air from flowing between the air communication channel 320 and the lower cover 200. In other words, an edge of the airtight member 323 may be completely sealed by the upper cover 100 and the lower cover 200. The air communication channel seating portion 210 may correspond to a shape of at least a part of the edge of the air communication channel 320, and may have a shape surrounding a part of a side of the air communication channel 320. The air communication channel seating portion 210 may be understood to support a lower side of the air communication channel 320.

The air communication channel receiving portion 120 and the air communication channel seating portion 210 may each include a projection receiving portion having a shape corresponding to each of the airtight member 323 projections, and thus it is possible to increase air tightness.

The side cover 300 is also positioned to seal a side of the battery module 400, or, a plurality of side covers 300 may be provided to seal both sides of the battery module 400. The guide portion 495 may guide the connection position of the side cover 300, and may also support a corner of the side cover 300. The guide portion 495 may include a pressurizing portion to pressurize the side cover 300 to firmly fix the side cover 300 to a side of the battery module 400. The plate 310 is positioned to be in close contact with the battery module 400. The sealing member 312 abuts the battery module 400 and may prevent air from flowing through space between the plate 310 and the battery module 400.

The blower 330 may be located on one side of the battery module 400, between the air communication channel 320 and the battery module 400. When the battery cells are vertically stacked as shown in FIG. 2, the blower 330 may be installed such that air may flow in a direction orthogonal to a direction in which the battery cells are stacked.

The electronic equipment chamber 500 may be located on one side, for example the upper side, of the battery module 400. One end of the first busbar 551 may be connected to the first external battery terminal (not shown) and the other end may be connected to the first internal battery terminal 480. One end of the second busbar 552 may be connected to the second internal battery terminal 490 and the other end may be connected to one terminal of the current sensor 530. The vertical portion may be supported by the internal partition wall 511 and external partition wall 512 extending upwardly from the electronic equipment chamber board 410. By a connection structure of the busbars 550, a portion connected to the second internal battery terminal 480 may be extended to another end of the battery module 400.

The use of the battery package 1 will now be described.

The air communication channel 320 may allow air to flow in from the outside through the first portion and may guide the air toward the battery module 400 through the second portion, or vice versa. In other words, air may be discharged from the battery module 400 to the outside by sequentially passing through the second portion and the first portion.

The blower 330 may force air to flow in the battery module 400. The blower 330 may create a low pressure region of an airflow in one side of the cover. For example, when air is allowed to flow toward one side of the cover by the blower 330, a low pressure region of an airflow may be created around the blower 330, and air may flow in from another side of the cover.

The blower 330 may allow heat inside the battery module 400 to flow to the outside of the battery package 1 through the air communication channel 320, as shown in FIG. 8. Conversely, the blower 330 may force air to flow into the battery module 400 from the outside through the air communication channel 320, as shown in FIG. 7. The above operations may be performed by a scheme of changing a rotation direction of a fan included in the blower 330. The blower 330 may operate based on a command input in a battery manager 420. The blower 330 may allow air to flow in through one of a pair of air communication channels 320 included in a pair of side covers 300, respectively, and may allow air to be discharged through the other air communication channel 320. Due to the blowers 330, the air flow passage of the battery cells 410 may be formed in a first direction parallel to a direction in which air is allowed to flow by the blower 330. In this example, the blower 330 may include a plurality of fans arranged in the first direction.

When the battery cell 410 is expanded due to an increase in an internal pressure under an overheating condition, for example, an overcharge or an internal short, a region in which the exhaust portion is formed may be detached due to a relatively low adhesive strength of the region compared to the other regions, and the materials in the battery cell 410 may be discharged through the exhaust portion.

In another example, the exhaust portion may have a lower strength than those of the other portions. When the internal pressure of the battery cell 410 increases, the exhaust portion may be cracked earlier than the other portions, and the materials in the battery cell 410 may be discharged through the exhaust portion.

The exhaust channel 130 may guide internal materials of a battery cell 410 of FIG. 6 spilled from an exhaust portion 418 of FIG. 6 to be discharged toward the outside. The discharge guide 460 may function to guide materials discharged from the exhaust portion toward the exhaust channel 130. When the materials flow through the discharge guide 460, the pair of blowers 330 included in the pair of side covers 300 may operate to prevent air from being discharged through the pair of air communication channels 320.

The external battery terminal (not shown) of the electronic equipment chamber 500 may be configured to supply power from the battery module 400 to the outside, and may include a first external battery terminal (not shown) and a second external battery terminal (not shown) that are electrically connected to both the electrodes of the battery module 400, respectively.

The electronic equipment chamber 500 may also sense a state of the battery module 400 or may control an operation of the battery module 400. The controller 520 may control operations of electronic components included in the electronic equipment chamber 500 and the like. The controller 520 may be connected to the battery module 400 and may sense a charging state of the battery module 400, a period of use of the battery module 400, a number of times the battery module 400 is charged and/or discharged, a battery life, whether the battery module 400 malfunctions, and the like. Also, the controller 520 may control an operation of the battery module 400. For example, the controller 520 may control a battery cell of the battery module 400 to be selectively charged or discharged, or may prevent at least one battery cell from being used based on whether the battery module 400 malfunctions.

Advantageously, according to embodiments of the present invention, a controller relatively greatly affected by an electromagnetic field may be located in a center of an electronic equipment chamber and a busbar in which a high current flows may be located in an outside of the electronic equipment chamber, and thus it is possible to significantly reduce a possibility of error occurrence in an electronic product. In addition, it is possible to realize a compact and lightweight product by efficiently arranging components in an electronic equipment chamber. Furthermore, a terminal of a battery module and a terminal of each of electronic components included in an electronic equipment chamber may be separate from each other or may be arranged in different directions, and thus it is possible to prevent the terminals from being in contact with each other despite a physical deformation due to an external shock. In other words, a fire accident occurring due to an unexpectedly electrical connection may be prevented.

What is claimed is:

1. An electronic equipment chamber, comprising:
   an electronic equipment chamber board on which at least one electronic component among a current sensor, a relay, and a fuse is disposed;
   a controller located in a center of the electronic equipment chamber board, the controller electrically connected to the electronic component and configured to control the electronic component;
   a plurality of busbars electrically connected to the electronic component and disposed along an outer edge of the electronic equipment chamber board, the plurality of busbars spaced apart from the controller; and
   a partition wall located on at least one side of one busbar among the plurality of busbars, the partition wall has an internal partition wall that is located between the controller and the busbar and an external partition wall, the internal partition wall configured to support one side of the busbar and the external partition wall configured to support an opposite side of the busbar;
   wherein a separation preventing portion is located above the internal partition wall or the external partition wall and forms an abutment over the busbar.

2. The electronic equipment chamber of claim 1, wherein the internal partition wall has a height higher than a height of the busbar.

3. The electronic equipment chamber of claim 1, wherein the controller has a rectangular shape of which a corner portion is recessed inwardly, and an electronic component is located in the recessed portion.

4. The electronic equipment chamber of claim 1, wherein the electronic component is a relay having two terminals on one side.

5. A battery package, comprising:
   an electronic equipment chamber having an electronic equipment chamber board on which at least one electronic component among a current sensor, a relay and a fuse is disposed, and having a plurality of busbars disposed along an outer edge of the electronic equipment chamber board and connected to the electronic component, the plurality of busbars comprise a first busbar located in a corner portion of the electronic equipment chamber, a second busbar, and a third busbar located in an opposite corner portion of the electronic equipment chamber; and
   a battery module having a first internal battery terminal and a second internal battery terminal electrically connected to the plurality of busbars, and the plurality of busbars comprises the first busbar connected to the first internal battery terminal and the second busbar connected to the second internal battery terminal, the battery module located on one side of the electronic equipment chamber.

6. The battery package of claim 5, wherein the electronic equipment chamber further comprises a controller electrically connected to the electronic component, the controller configured to sense a state of the battery module and to control the electronic component.

7. The battery package of claim 6, wherein the controller is located in a center of the electronic equipment chamber board and spaced apart from the plurality of busbars.

8. The battery package of claim 5, wherein the electronic component is disposed between the second busbar and the third busbar.

9. The battery package of claim 8, wherein a current sensor, a relay and a fuse are connected in series between the second busbar and the third busbar.

10. The battery package of claim 5, wherein the electronic component is a fuse seated in the electronic equipment chamber.

11. A battery package comprising:
a battery module having a plurality of battery cells;
a blower located in one side of the battery module;
internal battery terminals connected to both electrodes of each of the battery cells;
an electronic equipment chamber having at least one electronic component electrically connected to the internal battery terminals, a controller electrically connected to the electronic component and configured to control the battery module and the electronic component, an electronic equipment chamber board configured to support the controller and the electronic component, and a plurality of busbars disposed along an outer edge of the electronic equipment chamber board, the plurality of busbars configured to electrically connect the electronic component and the internal battery terminals; and
a cover having an air communication channel, the air communication channel fluidly connecting the battery module to an outside of the cover, the cover covering at least a part of the battery module and at least a part of the electronic equipment chamber, the air communications channel being formed integrally with the cover and having a first portion perpendicular to a side of the battery module and a second portion parallel to the side of the battery module.

12. The battery package of claim 11, wherein the battery module has a parallelepipedal shape, the electrodes are located on a front side of the battery module, the electronic equipment chamber board is located on a top surface of the battery module, and the controller is located in a center of a top surface of the electronic equipment chamber board.

13. The battery package of claim 11, wherein the electronic component is a current breaker.

14. The battery package of claim 13, wherein the current breaker is located on the top surface of the electronic equipment chamber board.

15. The battery package of claim 14, wherein the internal battery terminals and the current breaker are located on opposite sides of the electronic equipment chamber board.

16. The battery package of claim 15, wherein the controller is located between the internal battery terminals and the current breaker.

17. The battery package of claim 16, wherein a busbar that connects the internal battery terminals and the current breaker has a vertical portion having a width direction perpendicular to the electronic equipment chamber board.

18. The battery package of claim 14, wherein the current breaker has a relay, both terminals of the relay located in one corner portion of the electronic equipment chamber board.

19. The battery package of claim 18, wherein the current breaker has a fuse, both terminals of the fuse located in another corner portion of the electronic equipment chamber board.

* * * * *